United States Patent [19]

Wampfler

[11] 4,093,047
[45] June 6, 1978

[54] TRAVELLING CABLE SUPPORT SYSTEM

[76] Inventor: Manfred Wampfler, Markter Weg 5, D-7858 Weil am Rhein-Markt, Germany

[21] Appl. No.: 778,199

[22] Filed: Mar. 16, 1977

[30] Foreign Application Priority Data

Jun. 23, 1976 Germany .............................. 2628112

[51] Int. Cl.² .......................................... H02G 11/06
[52] U.S. Cl. .................................... 191/12 R; 174/69; 248/51; 267/73; 339/119 C
[58] Field of Search ................. 191/12 R; 248/51, 52, 248/90; 212/131; 137/355.16; 104/89; 114/213, 215; 267/69, 73, 74; 339/119 C, 22 T; 174/69

[56] References Cited
U.S. PATENT DOCUMENTS

| 1,686,678 | 10/1928 | Burke | 248/51 |
| 3,018,494 | 1/1962 | Guido | 267/74 |
| 3,289,983 | 12/1966 | Mennerdahl | 191/12 R |
| 3,399,909 | 9/1968 | Ambrose | 174/69 |
| 3,859,481 | 1/1975 | Sprague | 191/12 R |

*Primary Examiner*—Trygve M. Blix
*Assistant Examiner*—Reinhard J. Eisenzopf
*Attorney, Agent, or Firm*—Pollock, Vande Sande & Priddy

[57] ABSTRACT

A travelling cable support system for cranes, in which a cable is fixedly secured between successive sleds, is discussed. The sleds are connected together by resilient tension elements which stretch elastically on acceleration and subsequently give up their stored potential energy as kinetic energy. Non-elastic traction cords are also provided in conjunction with the cable and elastic elements for limiting the extension of the elastic elements.

10 Claims, 4 Drawing Figures

U.S.Patent June 6, 1978 Sheet 1 of 2 4,093,047
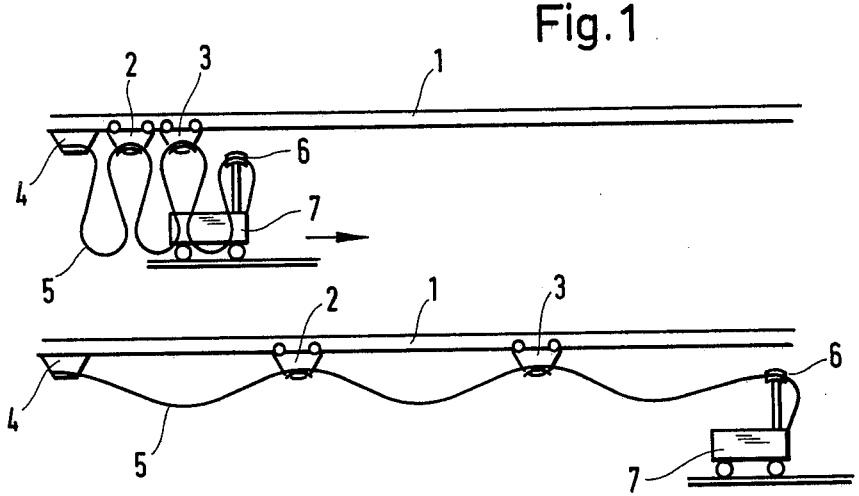
Fig.1
Fig. 2
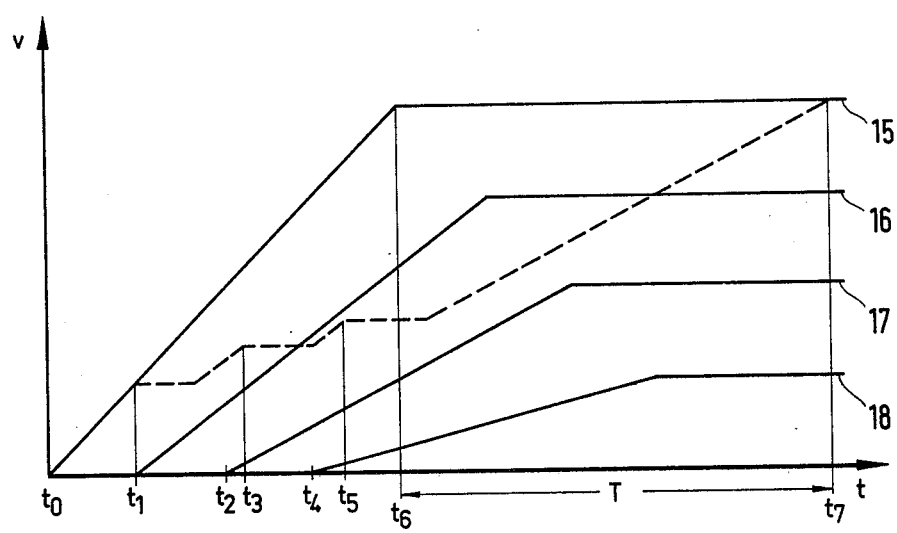
Fig. 3

TRAVELLING CABLE SUPPORT SYSTEM

FIELD OF THE INVENTION

The present invention relates to a travelling cable support system wherein the front conductor sled pulls the remaining conductor sleds, and more particularly to a system wherein an elastic cord is disposed between the respective individual conductor sleds so as to improve the acceleration and velocity characteristics thereof.

BACKGROUND OF THE INVENTION

Within such travelling cable support systems, power, such as, for example, electrical power, is passed from an end terminal, by means of conductors which are carried by conductor sleds, to a load, such as, for example, a travelling crane. The conductor sleds are movably carried on a rail, and between the individual conductor sleds and the conductor terminal and the end terminal, traction cords or ropes are provided. These cords or ropes are made shorter in length than the length of the intermediate sections of the conductors so as to ensure that breakage of the conductors, and more particularly, snapping of the individual cores of the conductors, is avoided.

Within conventional travelling cable support systems, the front conductor sled is moved with a relatively high rate of speed. In the case of travelling cranes, on which the conductor terminals are disposed, speeds of more than 4 meters per second may, for example, occur. In order to be able to attain this speed, the travelling crane must, for example, accelerate at a rate of more than 1.0 meter per second per second. When the travelling crane commences movement with such an acceleration rate, and with the cable support system initially in the contracted condition, the conductor sleds disposed behind the travelling crane will be at rest until the traction cord or rope is tensioned. The travelling crane, already moving at a substantial rate of speed, will accordingly suddenly begin to pull the conductor sleds disposed behind it, and this will mean that due to the mass of the next successive sled to be accelerated, substantial disruptive tension forces will be impressed upon the crane and traction rope. More particularly, part of the kinetic energy of the crane will be transferred as kinetic energy to the successive conductor sled which will commence travelling in a sudden manner.

The same process will be repeated when the remaining conductor sleds commence movement. Thus, every time a successive sled begins to move, substantial energy is transmitted from the crane to the particular conductor sled which is to be moved, and as a result substantial disruptive tension forces occur in the traction cords and their attachment means.

In order to reduce the disruptive tension forces which suddenly occur, there has already been a proposal to place spring elements between the points of connection of the traction cords and the respective conductor sleds. When pulling forces are suddenly impressed upon the particular conductor sled, the spring elements extend and the energy then absorbed, and potentially stored thereby, is later converted back into kinetic energy of movement with a corresponding shortening in length of the spring elements. The advantage of this is that the sudden disruptive tensioning forces are reduced, however, it is not possible to avoid the necessity of subjecting the conductor sled to substantial rates of acceleration in order to commence movement thereof. This initial rate of acceleration is dependent upon the mass of the conductor sled which is to be accelerated, and the kinetic energy of movement of the sled or sleds already moving. This means that when each individual conductor sled commences movement, the acceleration of the conductor sleds already moving will be reduced. This, in turn, means that in addition to the occurrence of disruptive tension forces, there is the disadvantage that the extension of the travelling cable support system will take a longer period of time than in an ideal case in which all conductor sleds are started with an acceleration rate which is optimum for the respective individual conductor sleds.

SUMMARY OF THE INVENTION

Within a travelling cable support system in which the front conductor sled pulls the remaining conductor sleds along a rail, an object to be achieved is the construction of a connection between the individual conductor sleds whereby the disruptive tension forces are substantially eliminated, and furthermore, each conductor sled is accelerated at a substantially constant rate to its end or terminal rate of speed.

Within a travelling cable support system of the specified type, the foregoing and other objects are achieved in accordance with the present invention through the provision of resiliently elastic elements interposed between the conductor sleds whereby, when the conductor sleds are moved apart or separated, the elements absorb and potentially store at least a part of the concomitant energy as deformation energy which is, at least in part, subsequently converted back into kinetic energy for accelerating the successive conductor sleds. Preferably, the conductor sleds are connected together by means of a relatively elastic cord, more particularly, an elastomeric cord. The cord should preferably have a high inherent damping factor and a total extension in length of, preferably, greater than 50%.

This arrangement makes it possible to ensure that the energy required for commencing movement of any one of the conductor sleds is firstly stored, substantially as deformation energy, in the resilient element, and subsequently, in accordance with the mass of the conductor sled to be set in motion, this energy is not suddenly transmitted, but to the contrary, is gradually transferred, as kinetic energy of motion, to the successive conductor sled to be pulled. It is thus possible to ensure that the disruptive tension forces are avoided and the respective successive conductor sled is uniformly accelerated from rest to its final rate of speed.

The resilient element can also be provided with damping means which dissipates a large amount of the energy absorbs.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a side elevation view of a travelling cable support system in the contracted condition;

FIG. 2 is a side elevation view of a travelling cable support system in the extended condition;

FIG. 3 is a speed-time graph; and

DETAILED DESCRIPTION OF THE PREFERRED EMBODIMENT

Figure 4:
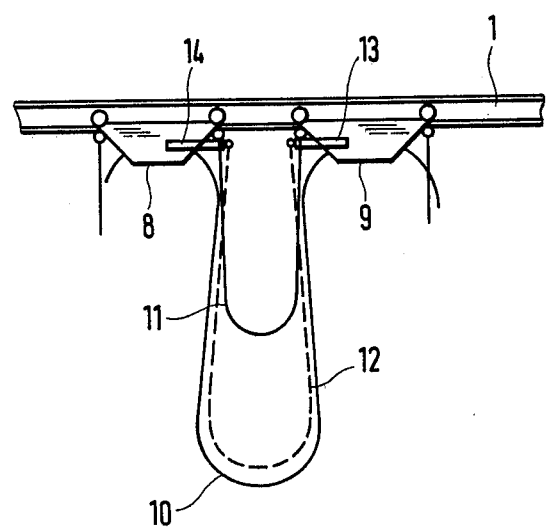
FIG. 4 is a side elevation view of an embodiment of the present invention.

Referring now to the drawings, and more particularly to FIGS. 1 and 2 thereof, a travelling cable support system is seen to comprise several conductor sleds 2 and 3 guided on a rail 1. In the embodiment shown there are only two conductor sleds, however, a substantially larger number of conductor sleds may be employed.

Starting from an end terminal 4 one or more conductors, such as, for example, electrical conductors 5, pass, by means of the conductor sleds 2 and 3, to a conductor terminal 6 mounted, for example, on a travelling crane 7. When the travelling crane 7 is moved in the direction shown by the arrow, it will accelerate at, for example, 1 meter per second per second to a speed of, for example, 240 meters per minute, or 4 meters per second. As soon as the conductor loop defined between the conductor terminal 6 and the conductor sled 3 has been removed or reduced to zero as a result of the conductor portion defined between terminal 6 and sled 3 having been tensioned, the conductor sled 3 will suddenly start to move. The same will then happen to the conductor sled 2 when the conductor loop defined between the conductor sled 3 and the conductor sled 2 has also been removed or reduced to zero as a result of the aforenoted tension.

The resulting course of movement is indicated in FIG. 3. In this respect, reference is to be had to the broken curve which diagrammatically represents the course of movement of the front conductor sled which is of course driven so as to pull the remaining conductor sleds along rail 1. From the point in time $t_0$ to the point in time $t_1$, this front conductor sled accelerates uniformly. At the point in time $t_1$, the cord or rope, and, respectively, the conductor loop defined between the front driven conductor sled and the next successive conductor sled, is pulled under tension conditions. This second conductor sled is suddenly accelerated at the point in time $t_1$ whereby the speed of the first, front conductor sled will not be increased further or will only be slightly increased. It is only when the second conductor sled has been accelerated up to a sufficiently high rate of speed that a detectable acceleration, and therefore an increase in the rate of speed, occurs in the case of the first front conductor sled. At the point in time $t_3$, the traction cord or more particularly, the conductor loop defined between the first and second, and the third conductor sleds, is tensioned whereby the third conductor sled is now suddenly accelerated. This again has an effect upon the first front conductor sled whereby no increase in speed, or only a slight increase occurs until the third conductor sled has been accelerated up to a sufficiently high rate of speed. At the point in time $t_5$, the conductor loop, or more particularly the traction cord extending between the third and fourth conductor sleds is tensioned whereby the fourth conductor sled will also be suddenly accelerated. With respect to the first front conductor sled, there will not be any further substantial increase in speed until the fourth conductor sled has been sufficiently accelerated. The first towing conductor sled will then experience uniform acceleration, and therefore an increase in speed, until the front conductor sled has reached its final rate of speed at the point in time $t_7$.

In FIG. 4, two adjacent conductor sleds 8 and 9, carried on the rail 1, are shown. Between these two conductor sleds 8 and 9 there is defined a conductor loop 10. An elastomeric cord or rope 11 is attached to the conductor sleds 8 and 9, and its length is less than the length of the conductor loop 10. The overall extended length of cord 11 is also shorter than the length of the conductor loop 10 in order to avoid any loading of conductor loop 10 when the cord 11 is tensioned. When the conductor sleds 8 and 9 are separated beyond the distance shown in FIG. 4, a substantial part of the energy required for commencing movement of the conductor sled 8 is stored as potential deformation energy in the cord 11 and this energy is then converted back into kinetic energy of motion for the conductor sled 8. As a result, the latter is accelerated uniformly and gradually up to its final rate of speed.

Between the conductor sleds 8 and 9 there is also provided a relatively non-elastic cord 12, such as, for example, a steel cord. This steel cord 12 is shorter in length than the conductor loop 10 and can be approximately as long as the elastomeric cord 11 when the latter is extended. The ends of steel cord 12 are connected to damping means 13 and 14 which are respectively fixedly mounted upon conductor sleds 9 and 8. With this arrangement, it is possible to ensure that the damping means 13 and 14 absorb energy when the conductor sleds 8 and 9 are separated. It is possible to use, for example, a hydraulic or gas shock absorber for this purpose. A part of the energy absorbed by the damping means 13 and 14 can be released again, in part and in a delayed fashion, as kinetic energy of motion.

Owing to the structural arrangement in accordance with the present invention, the sled movements occur in accordance with the graph of FIG. 3 as shown by the continuous lines. The curve 15 shows the acceleration of a first front conductor sled, the curve 16 shows the acceleration of a second sled, the curve 17 shows the acceleration of a third sled and the curve 18 shows the acceleration of a fourth sled. At the point in time $t_0$, the first conductor sled accelerates uniformly to its final rate of speed which is attained at the point in time $t_6$. At the point in time $t_1$, the elastomeric cord extending between the first and second conductor sleds is tensioned, and from this point in time $t_1$ onwards, the cord 11 is extended in length so as to store potential energy. Simultaneously from the point in time $t_1$, the second conductor sled is uniformly accelerated until it reaches its final rate of speed as indicated by the curve 16. The same occurs with respect to the third conductor sled at the point in time $t_2$, and as regards the fourth conductor sled, the same occurs at the point in time $t_4$.

The duration T indicates the difference in time expiring before the first conductor sled, in accordance with the prior art and in accordance with the present invention, has reached its final rate of speed. With the present invention, it is therefore possible to ensure that both the movement starting times of the sleds are reduced and in addition, the disruptive tension forces are avoided during the starting procedure.

Obviously, many modifications and variations of the present invention are possible in light of the above teachings. It is therefore to be appreciated that within the scope of the appended claims, the present invention may be practiced otherwise than as specifically described herein.

What I claim is:

1. A travelling cable support system comprising:

a guide rail;

a plurality of conductor sleds slidably mounted upon said guide rail for movement therealong wherein the first conductor sled is adapted to pull the remaining conductor sleds;

a plurality of non-elastic traction cords respectively interposed between said conductor sleds;

at least one conductor carried by said conductor sleds; and a plurality of elastomeric cords connecting together adjacent conductor sleds, the length of said elastomeric cords being less than the length of said traction cords when said elastomeric cords are not tensioned and being capable of obtaining a greater length than the length of said traction cords when said traction cords are tensioned, and the length of said traction cords being less than the length of said conductor.

2. A travelling cable support system in accordance with claim 1, wherein:

each of said elastomeric cords has a high inherent damping characteristic.

3. A travelling cable support system in accordance with claim 2, wherein:

the elastomeric cords have different characteristics.

4. A travelling cable support system in accordance with claim 3, wherein:

some of the elastomeric cords in said system have a greater degree of stiffness than the other elastomeric cords.

5. A travelling cable support system in accordance with claim 1, wherein:

the total extension in length of each of said elastomeric cords is at least 20% and preferably greater than 50%.

6. A travelling cable support system in accordance with claim 1, wherein:

each of said elastomeric cords is operatively connected to a damping means which, upon sudden loading, absorbs at least part of the loading force.

7. A travelling cable support system in accordance with claim 1, wherein:

each of said traction cords is operatively connected to a damping means.

8. A travelling cable support system in accordance with claim 7, wherein:

said damping means comprises shock absorbers.

9. A travelling cable support system in accordance with claim 1, wherein:

each of said traction cords and each of said elastomeric cords is operatively associated with damping means.

10. A travelling cable support system in accordance with claim 9, wherein:

the same damping means is operatively connected to both said elastomeric cords and said traction cords.

* * * * *